United States Patent [19]
Leisterer

[11] 3,906,339
[45] Sept. 16, 1975

[54] APPARATUS FOR DETERMINING THE ANGLE BETWEEN A ROTATABLE BODY AND A FIXED COIL SYSTEM, HAVING USE IN A COMPASS SYSTEM

[75] Inventor: Reinhard Leisterer, Bremen, Germany

[73] Assignee: Fried. Krupp Gesellschaft mit beschrankter Haftung, Essen, Germany

[22] Filed: July 31, 1974

[21] Appl. No.: 493,625

[30] Foreign Application Priority Data
Aug. 20, 1973  Germany............................ 2341984

[52] U.S. Cl................ 324/34 PS; 324/48; 33/1 PT; 33/341; 33/343
[51] Int. Cl.²......................G01R 33/00; G01B 7/30; G01C 17/04
[58] Field of Search............ 33/1 N, 1 PT, 313, 341, 33/343; 324/43 R, 47, 48

[56] References Cited
UNITED STATES PATENTS
2,588,619   3/1952   Drouin............................ 324/43 R
3,699,558   7/1970   Hendley et al....................... 33/343

FOREIGN PATENTS OR APPLICATIONS
1,189,981   4/1970   United Kingdom................ 33/1 PT

*Primary Examiner*—Robert J. Corcoran
*Attorney, Agent, or Firm*—Spencer & Kaye

[57] ABSTRACT

A system for deriving an electrical representation of an angle, which system includes two coils arranged to have their axes perpendicular to one another and connected to receive alternating excitation voltages which are identical except that the voltage to one coil is shifted in phase by 90° relative to the voltage to the other coil, whereby there is produced a magnetic field which rotates in the plane defined by the coil axes, and a positioning member located in the field and mounted for rotation about an axis perpendicular to the coil axes, the angle to be detected being between one of the coil axes and a reference axis fixed relative to the positioning member and extending perpendicular to the axis of rotation thereof. The positioning member includes a high magnetic permeability rod oriented at an angle to the axis of rotation of the positioning member and the system includes a stationary third coil surrounding the positioning member and oriented so that its axis is parallel to the axis of the positioning member. The rotating magnetic field produced by the two coils is distorted by the rod so that a portion of the field flux passes through the region enclosed by the third coil in a direction normal to the plane of the third coil, and induces in the third coil a voltage whose phase relative to the phase of the voltage in one of the two coils corresponds to the angle between the reference axis and the axis of that one coil.

10 Claims, 5 Drawing Figures

APPARATUS FOR DETERMINING THE ANGLE BETWEEN A ROTATABLE BODY AND A FIXED COIL SYSTEM, HAVING USE IN A COMPASS SYSTEM

BACKGROUND OF THE INVENTION

The present invention relates to a device for converting a representation of an angle between two axes into an electrical value with the aid of a coil system composed of two coils having mutually perpendicular coil axes, the coils being connected to receive two alternating voltages of the same frequency and amplitude but shifted in phase relative to one another by 90°, and a positioning member which is mounted to be rotated about an axis of rotation in the alternating magnetic field of the coil system for setting the angle, the angle lying between a reference axis perpendicular to the axis of rotation and one of the two coil axes.

In a known device of the above-mentioned type, the positioning member is a coil frame, for example, whose surface is intersected by the alternating field of the coil system. The coil frame is connected with the axis of rotation which is perpendicular to the surface normal and thus to the coil axes of the coil system. In order to determine the angle between the surface normal, as the reference axis, and one of the coil axes of the coil system, the voltage induced in the coil frame is measured. The amplitude of this voltage is proportional to the cosine of the angle. The coil frame is connected with a measuring device, for example, via slip rings, to measure this induced voltage.

The drawback of such a device, where the positioning member and the measuring system are coupled together mechanically, is particularly that the angle-changing torque must always be sufficiently high to overcome the static moment of inertia, or the moment of friction, which is not always the case in certain situations. If, for example, a compass needle is permanently attached on the axis of rotation in the direction of the reference axis to measure the angle between the coil axis and the north direction, the torque developed in this case is often too low to even rotate the coil frame with its slip rings.

SUMMARY OF THE INVENTION

It is therefore an object of the present invention to provide an apparatus in which the spatial angle between the reference axis of the positioning member and the coil axis of the coil system is converted to an electrical value and the measuring system and the positioning member are not electrically connected together so that even with the smallest amount of angle-changing torque it will be possible to measure the angle.

This is accomplished, according to the present invention, by including in the positioning member at least one highly permeable rod which is oriented at an oblique angle to the axis of rotation, and by fastening a third coil in a fixed spatial relationship in the coil system so that its surface normal is aligned with the axis of rotation and its turns enclose the positioning member, the opposite phase voltage induced in the third coil being shifted in phase with respect to the alternating supply voltage of one of the coils of the coil system by an amount which is equal to the angle between the reference axis of the positioning member and the coil axis belonging to this one of the coils.

Due to the magnetic effect of the two coils which are fed by two alternating voltages shifted in phase by 90°, a rotating field develops in the coil system. The highly permeable rod is disposed in this rotating field. If, for example, the axis of rotation, the reference axis and the longitudinal axis of the rod lie in one plane, and if the reference axis and thus also the highly permeable rod point in the direction of the axis of one of the coils of the coil system, an alternating flux is produced in the rod in the direction of its longitudinal axis and due only to the magnetic flux of that one of the coils. This alternating flux is not shifted in phase with respect to the magnetic flux of the one coil and has a shift in phase of −90° with respect to the alternating voltage feeding the coil. When the rod is rotated about the axis of rotation, the magnetic flux produced by the other coil of the system also contributes to the alternating magnetic flux in the longitudinal direction of the rod. There thus results a phase shift between the alternating flux in the rod and the magnetic flux of the first-mentioned coil, which phase shift is equal to the angle between the reference axis and the associated coil axis.

The highly permeable rod is arranged obliquely in the positioning member in the plane defined by the axis of rotation and the reference axis. The positioning member is enclosed by the windings of a third coil whose axis is aligned with the axis of rotation. Due to the oblique position of the rod, the field of rotation is spatially distorted so that a portion of the alternating flux passes through the region enclosed by the third coil in a direction normal to the plane of the third coil and induces a voltage therein. This induced voltage has a phase shift of −90° with respect to the alternating magnetic flux in the rod. If the reference axis points in the direction of one of the coil axes, the phase shift between the alternating voltage feeding this coil and the induced voltage in the third coil is $-180° = 2(-90°)$, which corresponds to the negative sign of the induced voltage (Faraday law). An additional phase shift occurs only if the reference axis is rotated with respect to this one coil axis. The phase shift is directly equal to the angle between this coil axis and the reference axis. Deviations resulting from the finite loss angle of the coils due to the ohmic resistances of the coils, can be calibrated by means of adjustable phase shifters or capacitors.

The material for the positioning member is preferably selected to assure that the rotary field of the coil system will not produce eddy currents in the positioning member which could produce a torque corresponding to the starting moment of asynchronous machines.

Since the measuring system in the form of the third coil is not mechanically coupled with the positioning member, for example, via slip rings, the only torque which must be produced for rotation of the positioning member is that required to overcome the bearing friction of the positioning member. For this reason a further feature of the present invention provides that the positioning member, whose dimensions and masses to be rotated are small, has its axis of rotation mounted in a conical bearing.

With such a bearing the required angle-changing torque is so small that a device according to the present invention can be used particularly well as a north reference member. In this embodiment of the present invention, the reference axis is disposed either in the plane defined in the positioning member by the axis of rotation and the longitudinal axis of the highly permeable rod or perpendicular to this plane. For the north reference member a compass needle is attached on the positioning member to point in the direction of the reference axis. The phase shift between the negated induced voltage of the third coil and the alternating voltage feeding one of the coils is directly equal to the angle between the magnetic north direction and the coil axis of the associated coil in the coil system.

In a further embodiment of the present invention the compass needle can be particularly easily replaced in that small permanent magnets are attached between the ends of two parallel highly permeable rods in the positioning member, the polarization of the permanent magnets being independent of the arrangement of the reference axis and extending either in the longitudinal direction of the rods or perpendicular thereto.

A device according to the present invention can be used with particular advantage in measuring buoys for determining the geographic north direction. With appropriate insulation of the coils it is also possible to operate the system while water flows therethrough since the rotatable positioning member and the measuring system are not electrically coupled together, for example via mechanical slip ring contacts or electrolytic transmission paths. The compact configuration permits use of the system under the rough conditions of the open sea.

According to a further embodiment of the invention, the coil system is composed of four partial coils which are attached to a cylindrical coil body. The coil body is provided with grooves which are angularly spaced at 45° intervals. Each partial coil is inserted into two grooves which are angularly spaced 135° apart, the partial coils being arranged at an angle of 90° with respect to one another so that the four partial coils are attached to the coil body in the manner of a loop winding. The oppositely disposed partial coils are connected in series and form one coil of the coil system. The winding heads of the partial coils are boxed inside one another in such a manner that all of the coils are electromagnetically coupled with the positioning member in the same manner and a high angle transmission accuracy is achieved.

The advantages realized with the present invention consist particularly in that the device can be constructed in a compact manner with small spatial dimensions and that a small angle-changing torque is already sufficient to rotate the axis of rotation of the positioning member so that the setting accuracy is very high.

DESCRIPTION OF THE PREFERRED EMBODIMENTS

Figure 1:
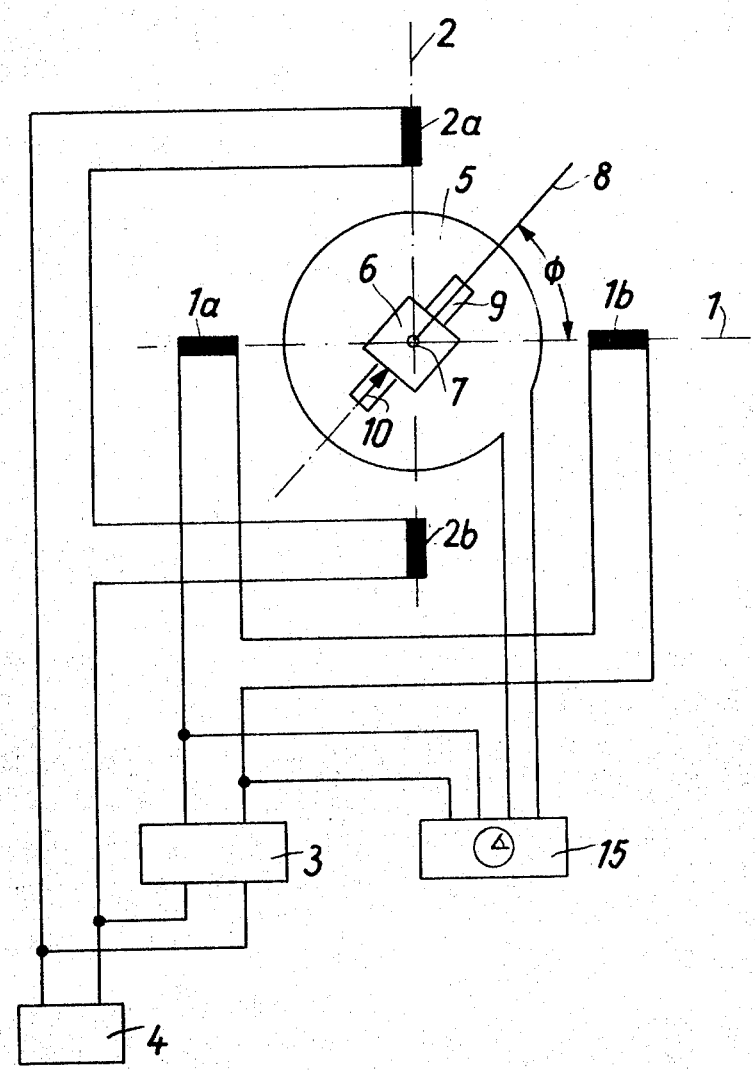
FIG. 1 is a schematic representation of a preferred embodiment of a device according to the invention.

FIG. 1 shows a device for converting a mechanical, or spatial, angle $\phi$ into an electrical value according to the present invention. The apparatus consists of a coil system in which two partial coils $1a$, $1b$ are located on coil axis 1 and two partial coils $2a$, $2b$ are disposed on coil axis 2, which is arranged perpendicular to axis 1.

The partial coils $1a$, $1b$ on coil axis 1 are connected in series and are connected to an alternating voltage generator 4 via a phase shifter 3. The alternating voltage generator 4 produces an alternating voltage having a given frequency and amplitude. The phase shifter 3 shifts the phase of the alternating voltage by 90°.

The partial coils $2a$ and $2b$ on coil axis 2 are also connected in series and are connected directly to the alternating voltage generator 4. An alternating magnetic field forms a rotating field in the coil system. In this rotating field there is disposed a stationary third coil 5 whose axis is perpendicular to the coil axes 1, 2 of the coil system. The windings of the third coil 5 enclose a positioning member 6 which is mounted to be rotatable about an axis of rotation 7 which is aligned with the axis of the third coil 5. A reference axis 8 is disposed on the positioning member 6 perpendicular to the axis of rotation 7. The angle $\phi$ between the reference axis 8 and the coil axis 1 can be set by means of the positioning member 6.

Figure 2:
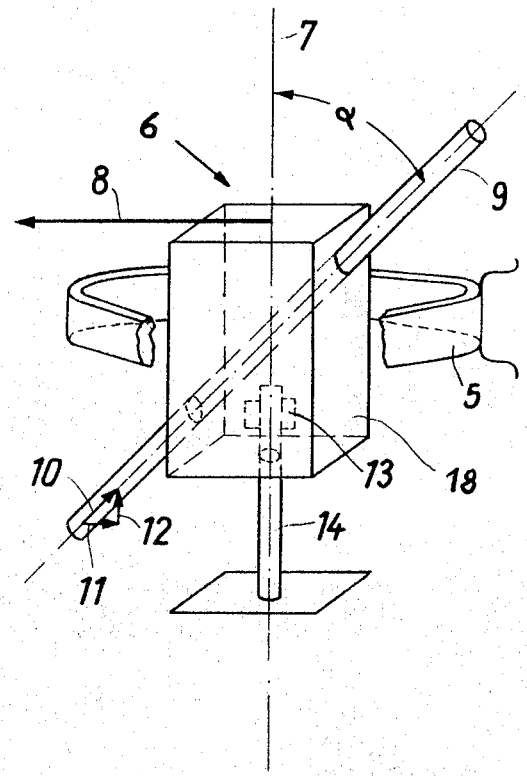
FIG. 2 is a perspective view of a portion of the device of FIG. 1.

In a plane defined by the axis of rotation 7 and the reference axis 8 a highly magnetically permeable rod 9 is disposed in the positioning member 6 and is fastened to extend at an angle $\alpha$ with respect to the axis of rotation 7, as shown in FIG. 2. This angle is preferably selected to be 45°.

It is also possible for the reference axis 8 to be oriented to be normal to a plane defined by the axis of highly permeable rod 9 and the axis of rotation 7.

An alternating flux having a direction 10 is produced in rod 9, which is disposed in the field of rotation of the coil system. By placing the rod 9 at an oblique orientation, the field of rotation of the coil system is spatially distorted so that the region enclosed by third coil 5 is traversed by part of the alternating flux 10. The alternating flux 10 can be divided into a component 11 parallel to the plane normal to the axis of coil 5 and a component 12 pointing in a direction parallel to the axis of rotation 7. The component 12 passes through the surface defined by the third coil 5, whose windings enclose the positioning member 6, and there induces a voltage.

The positioning member 6 is provided with a bearing 13 and is arranged to be rotatable about an axis 14 which is firmly connected with the coil system. Axis 14 and the axis of rotation 7 are aligned with one another.

In dependence on the angle $\phi$ between the reference axis 8 and the coil axis 1, or in dependence on the position of the projection of highly permeable rod 9 onto the plane of the coil axes 1, 2, the alternating flux 10 in rod 9 is shifted in phase with respect to the alternating flux 10 in partial coils $1a$, $1b$. The same phase shift is present between the alternating voltage feeding partial coils $1a$, $1b$ and the opposite-phase induced voltage of the third coil 5. In order to measure the phase shift, which is equal to the angle $\phi$, the third coil 5 and the output of the phase shifter 3 are connected with a phase measuring member 15 as shown in FIG. 1.

For use of the present application as a north seeking member the angle $\phi$ to be measured lies between the coil axis 1 and the magnetic north direction. The positioning member 6 in this case of application is permanently connected with a compass needle presenting the reference axis 8. The reference axis 8 either lies in the plane defined by rod 9 and the axis of rotation 7 or is perpendicular thereto.

Figure 3:
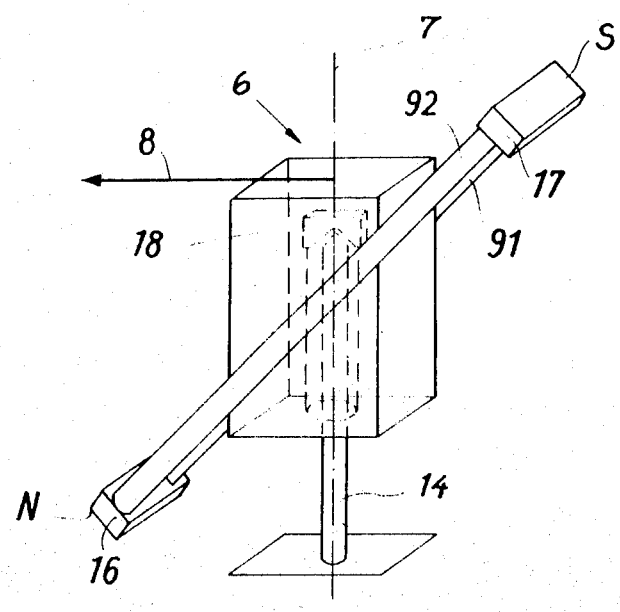
FIG. 3 is a perspective view of a positioning member.

FIG. 3 shows a particularly simple form of construction for the positioning member 6 in which the longitudinal axis of the highly permeable rod 9, which is divided into two partial rods 91 and 92, the reference axis 8 and the axis of rotation 7 lie in the same plane. At the longitudinal ends of the two partial rods 91 and 92 there are fastened permanent magnets 16 and 17 which are polarized in the direction of the rod axis. The partial rods 91 and 92 are connected with a bearing part 18 which is disposed in the center of the positioning member 6 and which presents a conical bearing that may be made of ruby, for example. The positioning member 6 is mounted on the stationary shaft 14 to be rotatable about the axis of rotation 7.

The combination of partial rods 91 and 92 and the permanent magnets 16 and 17 constitutes the compass needle which can be easily rotated on the conical bearing and is oriented in the north-south direction by the earth's magnetic field. The magnetic setting moment is particularly great when the system is used in the northern latitudes since the magnetic field lines there also have a suitable vertical component.

Figure 4:
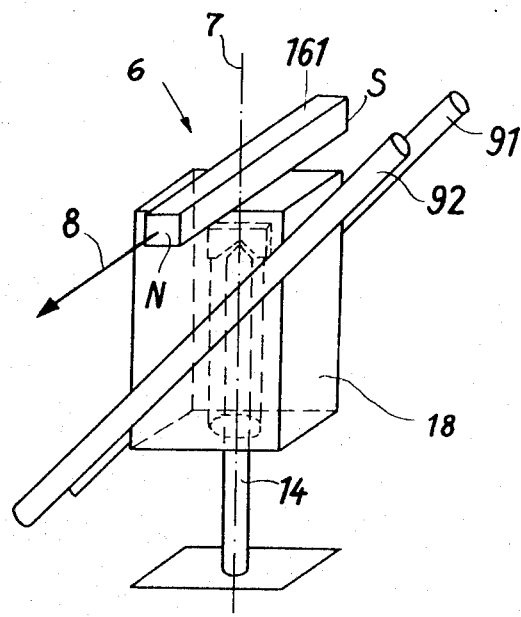
FIG. 4 is a view similar to that of FIG. 3 of a modified positioning member.

FIG. 4 shows an embodiment of the positioning member 6 in which the reference axis 8 is arranged perpendicular to the plane defined by the axis of rotation 7 and the rod 91, 92. The compass needle 161 is permanently connected with the bearing part 18 and points in the direction of the reference axis. A positioning member 6 designed as shown in FIG. 3 can advantageously be used in the northern geographical latitudes. A north seeking member with a positioning member 6 as shown in FIG. 4, can be used at any desired latitude to determine the magnetic north direction.

In order to prevent the positioning member 6 from rotating in the manner of the rotor of an asynchronous machine in the field of rotation of the coil system, care must be taken in the selection of the material for the highly permeable rod 9 and the compass needle 161 or the permanent magnets 16, 17, respectively, so that no eddy currents can form therein, which are known to lead to creation of a torque on the positioning member 6. For this reason a ferrite with a cubic space lattice should be used as the material for the highly permeable rod 9. A ferrite with a high coercive force should be selected for the permanent magnets 16 and 17 and for the compass needle 161. These materials are normally available in rod form as semifinished products so that arrangements particularly as shown in FIGS. 3 and 4 can be produced particularly easily. The material of the permanent magnets 16, 17 is for instance FERROX-DURE and the material of the rod 9 is FERROX-CUBE, both produced by PHILLIPS.

Figure 5:
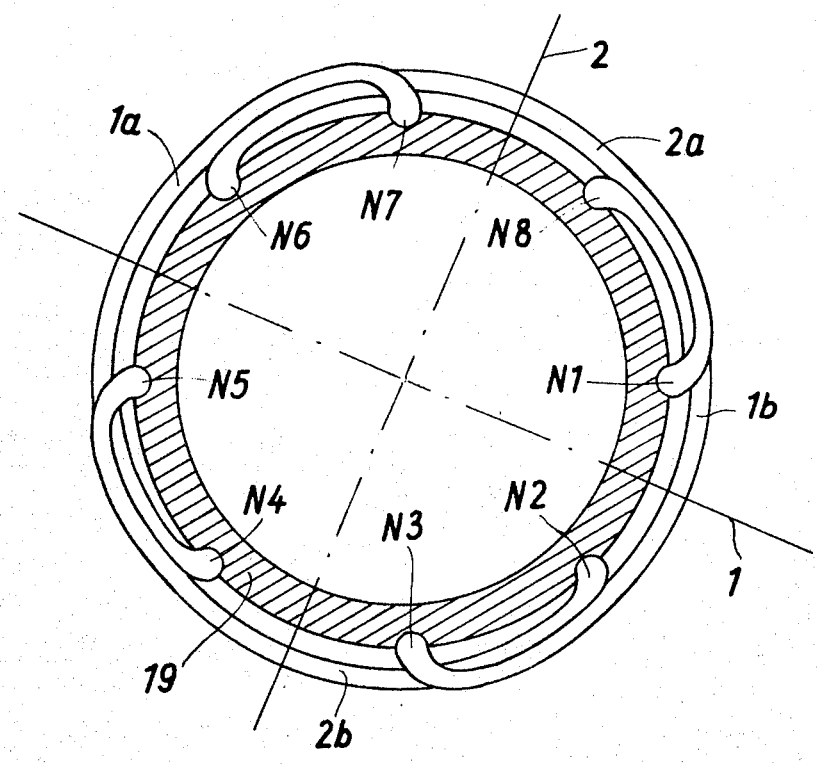
FIG. 5 is an axial view of a coil system used in embodiments of the invention.

FIG. 5 shows one specific embodiment of the coil system. A cylindrical coil body 19 is provided with eight grooves N1, N2, . . . N8 which are spaced 45° apart around the coil axis. Every alternate groove N2, N4, N6 and N8 accommodates one side of the winding turns of a respective one of the partial coils 2b, 1a, 2a, 1b. The turns of each partial coil 2b, 1a, 2a, 1b extend between grooves N2 and N5, N4 and N7, N6 and N1, and N8 and N3, respectively, and cover 135° circular arcs on the cylindrical body. As can be seen in FIG. 5, the partial coils 2b, 1a, 2a, 1b are fastened to the coil body 1a similarly to a loop winding.

Thus, for example, each turn of partial coil 1a extends along groove N4, around a 135° arc of the periphery of body 19, adjacent one axial end thereof, along groove N7, and finally back around the same 135° arc of the periphery of body 19, adjacent the opposite axial end thereof. The oppositely disposed partial coils 1a, 1b and 2a, 2b are each connected in series and form the two coils of the coil system. The axis of coil 5 and body 19 are in alignment and perpendicular to the axis 1, 2.

It will be understood that the above description of the present invention is susceptible to various modifications, changes and adaptations and the same are intended to be comprehended within the meaning and range of equivalents of the appended claims.

I claim:

1. In a device for deriving an electrical representation of a spatial angle, the device including a coil system composed of two coils arranged with their coil axes perpendicular to one another, a voltage source connected to apply to each coil a respective one of two alternating voltages of the same frequency and amplitude but shifted in phase with respect to one another by 90° for causing the two coils to produce a rotating magnetic field, and a positioning member mounted in the alternating magnetic field produced by the coil system to be rotatable about an axis of rotation perpendicular to the coil axes of the coil system, the spatial angle to be detected lying between a reference axis fixed relative to the positioning member and extending perpendicular to the axis of rotation thereof and one of the two coil axes, the improvement wherein: said positioning member comprises an elongate rod of high magnetic permeability material oriented with its longitudinal axis extending obliquely to the axis of rotation of said positioning member; and said device further comprises a third coil surrounding said positioning member and fixed relative to said two coils, said third coil oriented with its coil axis parallel to the axis of rotation of said positioning member; whereby a portion of the flux of the rotating magnetic field flows longitudinally through said rod to traverse the plane of said third coil, in a direction transverse to that plane, and induces, in said third coil, a voltage which differs in phase from the voltage applied to one of said two coils by an amount corresponding to the angle between the axis of that one of said two coils and the projection on the plane of said third coil of the longitudinal axis of said rod.

2. An arrangement as defined in claim 1 wherein the longitudinal axis of said rod is oriented at an angle of approximately 45° to the axis of rotation of said positioning member.

3. An arrangement as defined in claim 1 wherein the longitudinal axis of said rod, the axis of rotation of said positioning member, and the reference axis lie in one plane.

4. An arrangement as defined in claim 1 wherein the reference axis is arranged perpendicular to a plane defined by the axis of rotation of said positioning member and the longitudinal axis of said rod.

5. An arrangement as defined in claim 1 wherein said positioning member further comprises a conical bearing via which it is supported to be freely rotatable.

6. An arrangement as defined in claim 5 wherein said positioning member further comprises a compass needle mounted to extend in the direction of the reference axis.

7. An arrangement as defined in claim 6 wherein: the longitudinal axis of said rod, the axis of rotation of said positioning member and the reference axis lie in one plane; said rod comprises two parallel partial rods; and said compass needle comprises two permanent magnets each mounted at a respective end of said rod.

8. An arrangement as defined in claim 7 wherein said magnets are polarized in the direction of the longitudinal axis of said rod.

9. An arrangement as defined in claim 7 wherein said rod and said magnets are made of ferrite materials producing low eddy current losses.

10. An arrangement as defined in claim 1 wherein each of said two coils is composed of two coaxial partial coils, and said arrangement further comprises a cylindrical coil body carrying said third coil and provided with a plurality of substantially axially directed grooves spaced apart by 45° around the circumference of said body, with opposed coil sides of each said partial coil being disposed in a respective pair of said grooves which are 135° apart and said partial coils of one of said two coils being oriented at an angle of 90° to said partial coils of the other of said two coils.

* * * * *